United States Patent [19]
Chauvel

[11] Patent Number: 5,544,104
[45] Date of Patent: Aug. 6, 1996

[54] VIRTUAL CROSSPOINT MEMORY

[75] Inventor: Gerard Chauvel, Antibes, France

[73] Assignee: Texas Instruments Incorporated, Dallas, Tex.

[21] Appl. No.: 404,409

[22] Filed: Mar. 14, 1995

[30] Foreign Application Priority Data

Mar. 15, 1994 [FR] France .................................. 94 03165

[51] Int. Cl.$^6$ .................................................. G11C 13/00
[52] U.S. Cl. ................... 365/189.01; 365/189.04; 365/230.03; 365/230.05
[58] Field of Search .................. 365/189.01, 189.02, 365/189.04, 189.05, 230.01, 230.02, 230.03, 230.04, 230.05, 230.08

[56] References Cited

U.S. PATENT DOCUMENTS

5,109,361  4/1992  Yim et al. .............................. 365/218

*Primary Examiner*—Terrell W. Fears
*Attorney, Agent, or Firm*—William E. Hiller; Richard L. Donaldson

[57] ABSTRACT

An interconnection-point memory which includes an array of N1 input buses (Rj) intended to be connected to a first plurality of N1 data-sender devices, an array of N2 output buses (Ck) intended to be connected to a second plurality of N2 data-receiver devices, and interconnection means (17) for connecting the array of input buses to the array of output buses. The interconnection means include on the one hand, a third plurality of N3 switching memories (FIFO m) used as first-in, first-out FIFO devices provided with a write port (Din) and with a read port (Dout), and on the other hand, first control means (S[j,m],24a,24b) for connecting in a virtual manner the input port of at least one switching memory to a specified input bus, and second control means (S[k,m], 24a',24b') for connecting in a virtual manner at least one output bus to the read port of the said switching memory, so that the said specified switching memory constitutes a temporary interconnection point, independent of the input buses and output buses to be interconnected. This interconnection-point memory enables Application to the asynchronous transfer of data between senders and receivers.

8 Claims, 9 Drawing Sheets

VIRTUAL CROSSPOINT MEMORY

The present invention relates to the transmission of data and refers more particularly to the transmission of data between telecommunications terminals operating at different frequencies.

Applications in the telecommunications and computing sector are tending ever more to the use of an asynchronous transfer mode ATM standard for transferring data between terminals. In general, the sender and the receiver operate at different frequencies. The key element of an asynchronous transfer mode ATM is the switching matrix which establishes the connection and synchronizes the sender with the receiver.

A two-dimensional switching matrix of the aforesaid type connects input data originating from senders each operating at a different frequency to outputs linked to receivers each operating at a frequency which differs from that of the sender with which it is communicating.

The switching matrix therefore has two main functions:

a) to establish one or more connections between terminals, and b) to adapt the frequency of the transmitted data.

The switching element operates as a first-in, first-out FIFO device.

The clock signal which determines the speed of the input signals originating from a first sender controls the storage of these input data at the address defined by a write address pointer. The clock frequency depends on the frequency of the input data originating from the first sender and increments the address pointer.

A clock signal corresponding to the output data sequence controls the read cycle of the FIFO. A read address pointer selects a datum in the FIFO. The read datum appears on the output linked to the corresponding receiver. The clock signal corresponding to the frequency of the output data controls the incrementation of an address read register. The size of the FIFO device depends on the difference in frequency between the input and the output of the data and on the amount of information to be transmitted.

The write and read pointers operate with cyclic addressing. When the address of one or other of the pointers is at the bottom of the FIFO register, the next address is at the top of the FIFO register. Equality of the write and read address pointers establishes the clear signal.

When the read pointer catches up with the write pointer, with the equality of the two pointers, the buffer is clear. When the write pointer catches up with the read pointer the buffer is full.

The write cycle corresponding to the equality of the pointers is disabled.

A conventional switching matrix is formed of switching elements organized in rows and columns. A data input and clock bus connects the switching elements row by row.

A data output and clock bus connects the switching elements column by column.

For a switch having a dual-port memory architecture, access to the storage elements of the memory requires, for each port, logic modules associated with the storage elements such as input buffer circuits, preloading circuits, detection amplifiers, address command and decoding means, X decoding circuits and word line command circuits.

As a result, the useful area of the dual-port storage elements represents a small part of the total area of the interconnection-point memory component.

In the case for example of a 64-byte dual-port memory, the total areas of all the aforesaid logic modules represent 75% of the area of the memory.

Such a layout makes the memory bulky and expensive from the viewpoint of the area of silicon used, and for an acceptable chip size, the capacity of the memory is thereby limited.

In U.S. patent application Ser. No. 08/204,111, filed Mar. 1, 1994, now U.S. Pat. No. 5,475,644, issued Dec. 12, 1995, matrix interconnection memory architecture provided with a single write port per line of the matrix, and a single read port per column of the matrix is disclosed. Thus, the memory is of lesser bulk, leaving more relative room for the memory elements proper.

Even if the latter memory architecture offers a substantial improvement with respect to the prior memories, the logic circuits associated with the memory proper still occupy non-negligible room, which may possibly be further reduced in size, whilst also reducing the size of the memory proper.

The invention aims to achieve this objective by proposing a matrix memory device of large capacity and high performance, whose command logic circuits occupy no more than a minimum area of the total area of the memory.

The subject of the invention is therefore an interconnection-point memory including an array of N1 input buses intended to be connected to a first plurality of N1 data-sender devices, an array of N2 output buses intended to be connected to a second plurality of N2 data-receiver devices, and interconnection means for connecting the said array of input buses to the said array of output buses, characterized in that the said interconnection means include on the one hand, a third plurality of N3 switching memories used as first-in, first-out FIFO devices provided with a write port and with a read port, and on the other hand, first control means for connecting in a virtual manner the write port of at least one specified switching memory to a specified input bus, and second control means for connecting in a virtual manner at least one output bus to the read port of the said switching memory, so that the said specified switching memory constitutes a temporary interconnection point, independent of the input buses and output buses to be interconnected.

According to other characteristics of the memory according to the invention:

the said first control means comprise, for each switching memory a plurality of N1 input multiplexor circuits multiplexing the input buses to the write port of the relevant switching memory and, associated with each input multiplexor circuit, a control register enabling or disabling the said input multiplexor circuits on the basis of its binary content.

the said second control means comprise, for each switching memory, a plurality of N2 output multiplexor circuits for multiplexing the read port of the relevant switching memory to the N2 output buses, and, associated with each output multiplexor circuit, a control register enabling or disabling the said output multiplexor circuits on the basis of its binary content.

the said input buses and output buses include on the one hand data and address bits transmitted by the said N1 sender devices to the corresponding input multiplexor circuits and by the said corresponding output multiplexor circuits to the said N2 receiver devices, and on the other hand control bits transmitted to the said control registers, so as to ensure interconnection between a specified data and input address bus, and at least one specified data and output address bus.

the said control registers consist of flip-flops mounted in shift-register mode.

the memory includes a read amplification circuit connected between the read port of each switching memory and the corresponding output multiplexing circuits.

each output data bus includes an output buffer circuit, and several read amplification circuits are grouped together with the said output buffer circuit.

the said third plurality N3 of switching memories is smaller than the number N2*N3 of interconnection points of the memory.

The invention will be better understood with the aid of the description which follows, given merely by way of example and offered with reference to the attached drawings, in which: L

Figure 1:
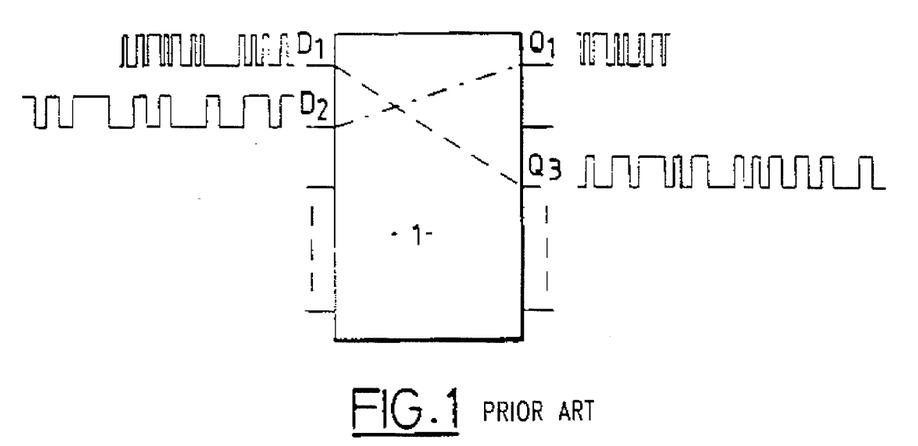
FIG. 1 is a schematic view of an asynchronous transfer mode switching matrix of known type.

Represented in FIG. 1 is a two-dimensional asynchronous transfer mode switching matrix 1 of known type.

The matrix includes inputs D1, D2, . . . , intended to be connected to senders each operating at a different frequency as shown by the corresponding input signals and outputs Q1, Q2, Q3, . . . , intended to be connected to receivers which each operate at a frequency which differs from that of the sender with which they are communicating.

This matrix connects the input data D1 to the output Q3 and the input data D2 to the output Q1 during the same period of time.

The speed of the input data D1 is in the present example greater than that of the output data Q3 required by the terminal connected to the output Q3.

In the second connection D2-Q1, the speed of the input data D2 is less than the speed of the output data Q1.

As already indicated above, the switching matrix has therefore mainly:

a) to establish one or more connections between terminals;

b) to adapt the frequency of the transmitted data.

Figure 2:
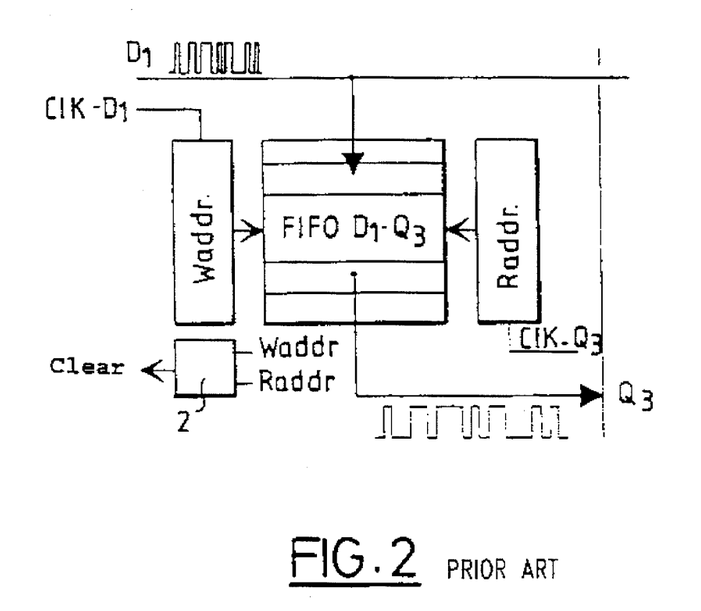
FIG. 2 is a schematic view of a switching element helping to make up the matrix of FIG. 1.

For this purpose, the switching matrix is formed of switching elements such as that represented in FIG. 2.

Described by way of example in this figure is the switching element establishing the link between the input D1 and the output Q3.

It includes principally a FIFO device designated FIFO D1-Q3 linked on the one hand to the input D1 and on the other hand to the output Q3 and with which are associated a write address pointer Waddr controlled by a clock signal Clk-D1 and a read address pointer Radd2 controlled by a clock signal Clk-Q3.

Clock signal Cl1-D1 controls the storage of the input data D1 at the address defined by the write address pointer Waddr. The frequency of the clock signal Clk-D1 depends on the frequency of the input data D1.

The signal Clk-D1 increments the address pointer Waddr.

Clock signal Clk-Q3 controls the read mode of the FIFO. The read address pointer Raddr selects a datum in the FIFO.

The read datum appears on the output Q3.

The clock signal Clk-Q3 controls the incrementation of the address read register Raddr.

The size of the FIFO register depends on the difference in frequency between the data input and output.

The pointers Waddr and Raddr operate by cyclic addressing. When the address of the pointer Waddr or the pointer Raddr is at the bottom of the FIFO register, the next address is at the top of the FIFO register.

Equality of the address pointers Waddr and Raddr establishes the clear signal determined by a status register 2 associated with the FIFO represented in FIG. 2.

The write cycle is then disabled.

A four-row and four-column switching matrix represented in FIG. 3 will now be described. Such a known matrix uses, at each of its sixteen interconnection points, a FIFO element such as the one described in conjunction with FIG. 2.

A clock Clkin and data Din input bus connects the switching elements FIFO 00 to FIFO 33 row by row.

There are therefore in the present example four clock and data input buses.

Din 0 Clkin 0, Din 1 Clkin 1, Din 2 Clkin 2 and Din 3 Clkin 3.

A clock Clkout and data Dout output bus connects the switching elements FIFO 00 to FIFO 33 column by column.

There are therefore also four buses Dout 0 Clkout 0 to Dout 3 Clkout 3.

Figure 3:
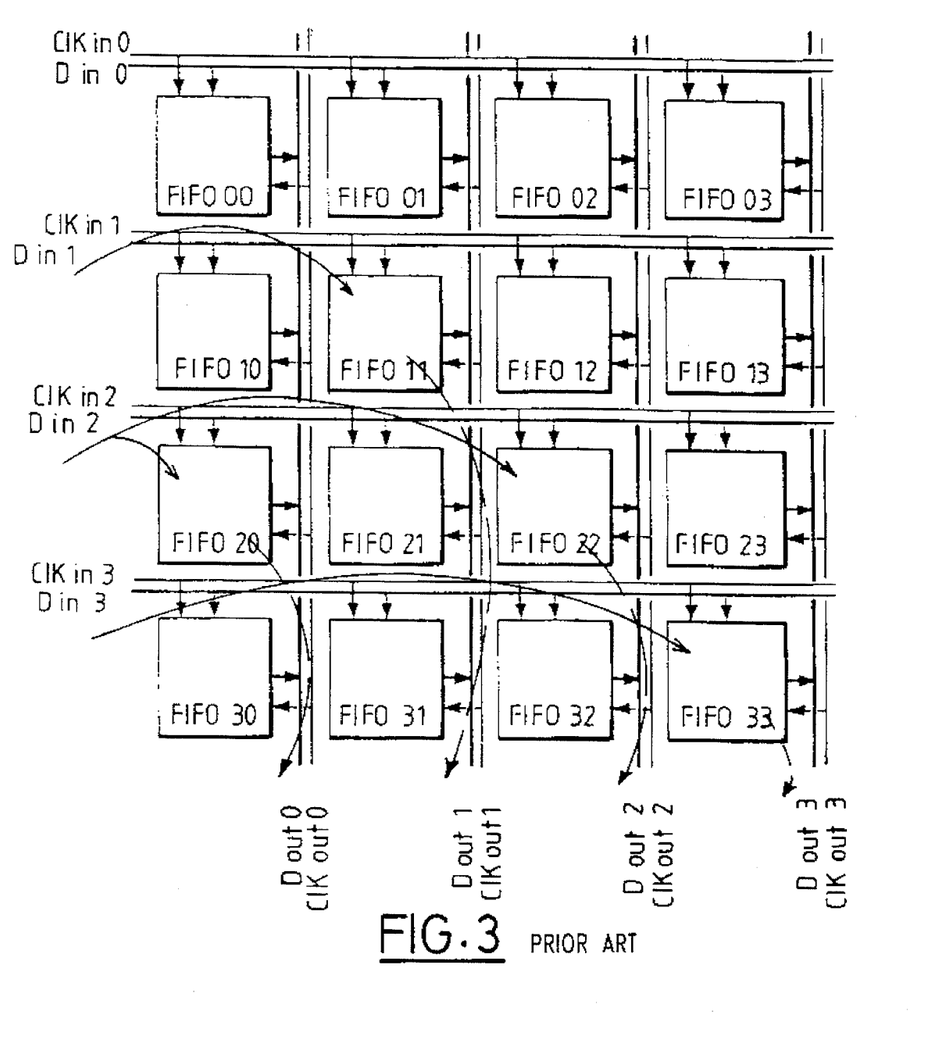
FIG. 3 is a more detailed schematic view of a switching matrix of known type with four rows and four columns of switching elements.

In FIG. 3, three asynchronous data transfers represented by arrows are in progress. The first between Din 1 and Dout 1, the second between Din 2 and Dout 0 and Dout 2 and the third between Din 3 and Dout 3. At a given instant, only one FIFO is read per column. In each row Din can be transferred into one of the various switching elements FIFO 00 to FIFO 33.

FIG. 3 describes how a communication is established between an input, a row of the matrix, and an output, a column of the matrix. Each intersection of the matrix contains a FIFOs generally of less than 64 bytes in size. The FIFO can be embodied with the aid of registers. However each register cell demands around 20 transistors. For a 64-byte FIFO around 12,000 transistors are necessary for the part devoted to the registers and to additional logic modules to perform the decoding and generate write and read addresses so as to connect the outputs of the FIFOs to the output buses and to generate a "clear" signal.

In practice, this solution necessitates an embodiment of the matrix as separate components since the number of transistors exceeds the current capabilities of integration.

A FIFO of larger dimension uses memory cells instead of register cells in order to reduce the size of the storage elements.

A dual-port memory cell includes just eight transistors per cell, instead of twenty for a register.

Figure 4:
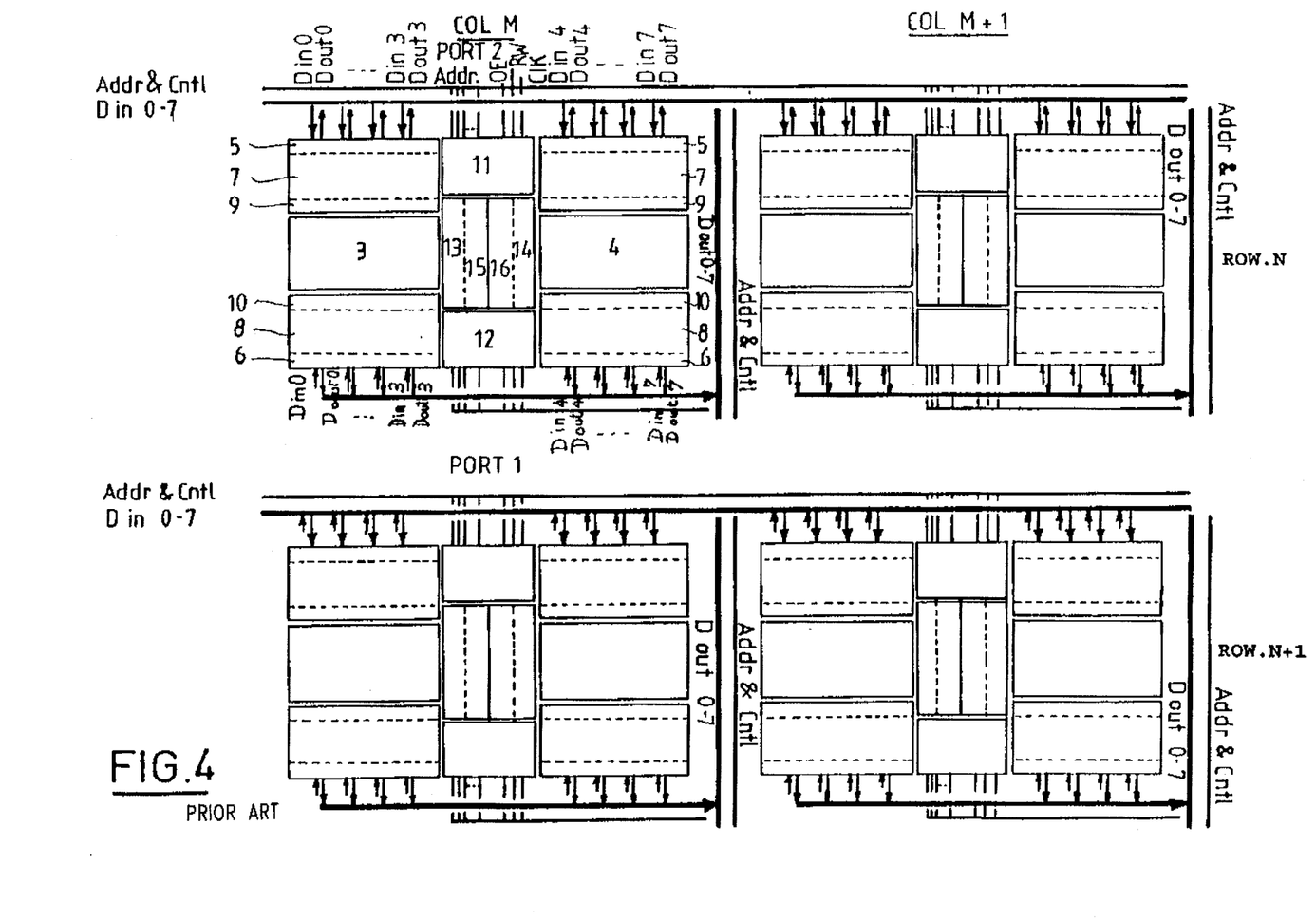
FIG. 4 is a partial view of the internal structure of a dual-port memory array of conventional type.

FIG. 4 represents four 64-byte dual-port memories laid out as a switching matrix. Ports 1 and 2 of each memory are symmetric and each comprise: a data input with eight lines Din-0 to Din-7; a data output with eight lines Dout-0 to Dout-7; six address lines for selecting one byte out of 64, an output enable OE controlling a three-state output; a read/write signal RW and a clock Clk.

By comparison with the register cells, the dimension of a 64-byte FIFO using a dual-port memory cell is smaller. However, in the known layouts, the area of the storage elements of the dual-port memory uses a small part of the total memory area. This is due to the extra logic modules which are required in order to access the storage elements of the memory.

Indeed, each 64-byte dual-port memory represented in FIG. 4, only one of which is detailed here, includes two 32-byte memory cells 3 and 4.

To each memory cell is linked an input/output buffer circuit 5, 6, a detection amplifier 7, 8 and a preload circuit 9, 10 associated with each port.

Furthermore, each dual-port memory includes, for each port, a decoding and address command circuit 11, 12 and in order to access each memory cell, word line command elements 13, 14 and X decoding circuits 15, 16.

In the case of a 64-byte dual-port memory, the total areas of all these modules represent 75% of the area of the memory. The storage elements of the 64-byte memory have an area of 25% of the total area of the memory.

Access to the dual-port memory will now be described.

The four dual-port memories of FIG. 4 are laid out as a switching matrix and belong to columns M and M+1 and to rows N and N+1 of this matrix.

An input data bus Din 0 to 7 and control signal and address buses connect the memories row by row. Control signal and address data output buses Dout-0 to 7 connect the memories column by column.

It is important to understand that an integrated switching matrix of large size cannot use such a layout, since this would lead to having to integrate a number of transistors superior to the current capabilities of the art.

Each memory is too large by reason of the poor ratio of the area of the memory cell to the total area. The routing factor is large by reason of the numerous row and column command and address data buses. Electrical performance is limited by the length of the buses.

As will be described further on with reference to FIGS. 7 et seq., the memory with virtual connection points according to the invention exhibits an architecture which considerably improves the ratio of the area of the memory cell to the total area and improves electrical performance.

Generally, a memory is defined by two parameters: the number of words and the number of bits per word.

The interconnection-point memory is a two-port memory array. The parameters defining the structure are the number of words and the number of bits per word for a two-port memory element or the number of columns and the number of rows of the memory elements.

In the application to a switching matrix, each two-port memory module is used as a FIFO. The structure of a two-port memory which is suitable for the implementation of the invention is described further on in conjunction with FIG. 9.

Figure 5:
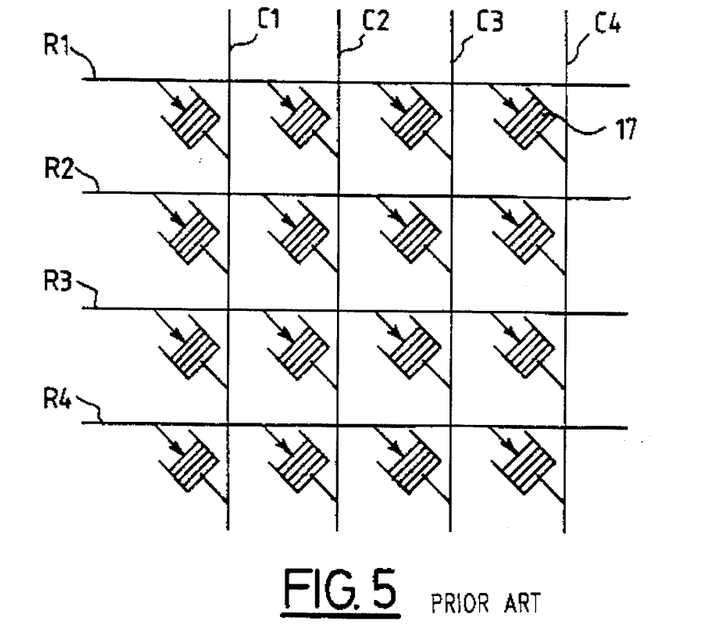
FIG. 5 is a more schematic representation of the switching matrix according to FIG. 3.

Referring to FIG. 5, enlisting schematically the structure of the interconnection matrix of FIG. 3, while using at each interconnection between a row (R1–R4) corresponding to an input bus and a column (C1–C4) corresponding to an output bus of the matrix, a FIFO element 17, for example a FIFO with a capacity of 64 bytes. This solution allows all the combinations of connection of an input bus (row) to one or more output buses (columns), and does so without blockage since a FIFO 17 is dedicated to each interconnection. As indicated earlier, this solution is expensive in terms of the number of transistors, and for 64-byte FIFOs cannot be integrated into a single component, thus limiting the operating performance of the asynchronous transfer from the inputs to the outputs.

Figure 6:
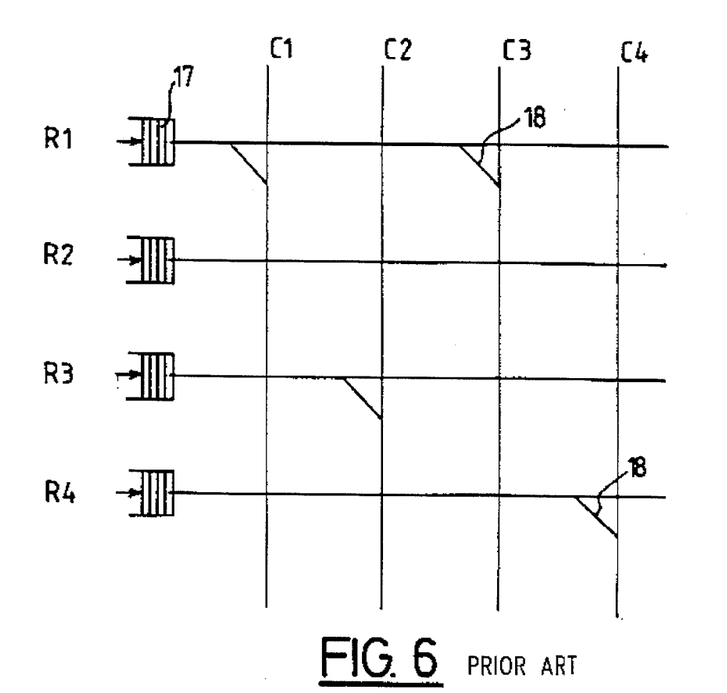
FIG. 6 is a basic representation of another switching matrix structure according to the state of the art.

FIG. 6 shows another known solution in which the fewer FIFO elements 17 are linked to the input rows R1 to R4 of the matrix. The trunking of the inputs to the outputs is performed by a matrix of simple interrupt switches 18 (shown schematically as oblique strokes). In the example represented, the inputs on the first line are trunked to the outputs of the first and third columns; the third line is trunked to the second column, and the fourth line is trunked to the fourth column.

This solution is economical since for a matrix with N rows and N columns, the number of FIFO is equal to N instead of $N^2$. On the other hand, this solution involves blockages in the trunking of the data and a drop in the transfer performance. Indeed, in order to be able to change the destination of the information from the FIFO of the first row R1, it is necessary to wait for this FIFO to be clear, this impairing the rate of asynchronous transfer of data packets.

DESCRIPTION OF THE INVENTION

Figure 7:
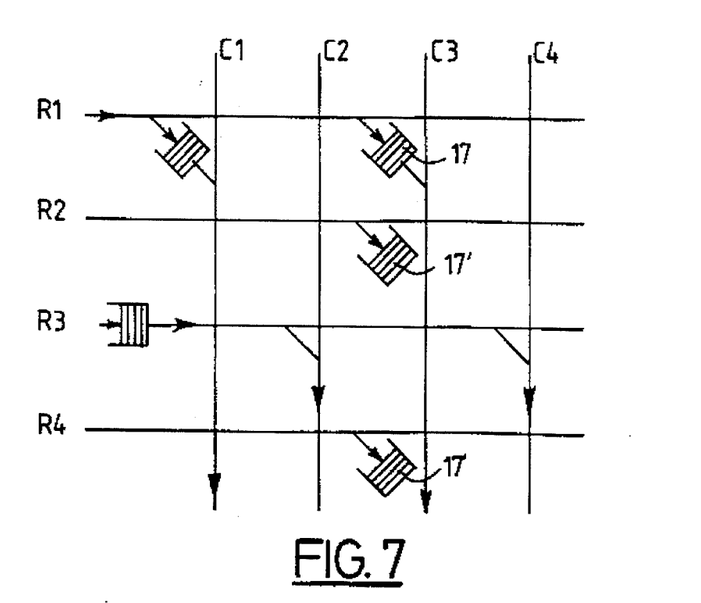
FIG. 7 is a basic representation of the switching matrix structure used by the memory according to the invention.

FIG. 7 represents schematically the principle used according to the invention in order to eliminate the drawbacks mentioned earlier. With respect to the scheme of FIG. 5, only some of the FIFOs 17 are used (5 FIFOs in this instance) to establish a communication between the input buses (rows R1–R4) and the output buses (columns C1–C4). However, the position of the FIFOs 17 used varies over time. The invention allows the virtual placement of the FIFOs at the row/column interconnections solely as a function of the instantaneous communication needs. In the example represented, the sender inputting on the first row R1 is linked to a first receiver (not represented) by the output bus on the first column C1, and to a second receiver with a different frequency by the output bus on the third column C3. Similarly, the sender (not represented) inputting on the third row R3 is connected under the same conditions to the output buses on the second and fourth columns C2, C4.

FIG. 7 moreover represents two FIFO elements 17' which are unused or have no output assigned, which are available for assigning to a next input/output transfer.

According to the invention, the assigning of a FIFO 17 is merely temporary, and depends on the instantaneous communication needs. The various FIFOs therefore establish a string of virtual paths between inputs of the interconnection memory and outputs.

Figure 8:
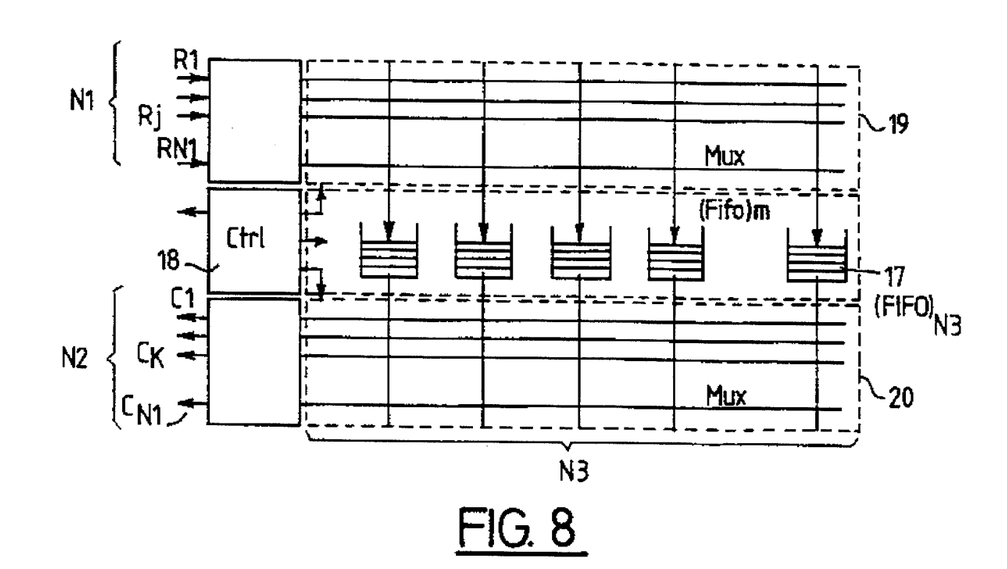
FIG. 8 is a more detailed schematic representation employing the structure of the matrix according to FIG. 7.

As FIG. 8 shows, the interconnection-point memory according to the invention includes, in a general way, a plurality N1 of input buses originating from N1 data senders, a plurality N2 of output buses destined for N2 data receivers, and a certain number N3 of FIFOs 17 which does not depend directly on the number of inputs and outputs, but on the number of possible connections at a given instant. N3 will preferably (but not compulsorily) be greater than N1 and greater than N2 so as to minimize any possible transmission blockage problems, but N3 may be very much less than N1*N2 while still ensuring acceptable transmission quality, with a low blockage rate (or than N2 in the case of a memory with N1=N2=N lines and N columns). The memory furthermore includes control means 18 for on the one hand connecting at a given instant the write port of at least one switching memory to a specified input bus Rj ($1 \leq j \leq N1$) and on the other hand for connecting the read port of the FIFO memories used to an output bus Ck (1≦k≦N2). Thus, a specified physical FIFO memory constitutes a, temporary, virtual interconnection point between an input bus Rj and at least one output bus Ck, but without depending on the relevant input and output buses. Stated otherwise, during a subsequent data transfer, the same FIFO element will be able to serve in the connecting of other input/output buses.

The control module 18 associates one or more available FIFO(s) with an input Rj across an input multiplexor array 19. The input/output connection is performed by linking the FIFOs used to the corresponding outputs across an output multiplexor array 20.

When the connection has terminated, the FIFOs used are freed for another connection to a different position of the row/column virtual matrix.

Figure 9:
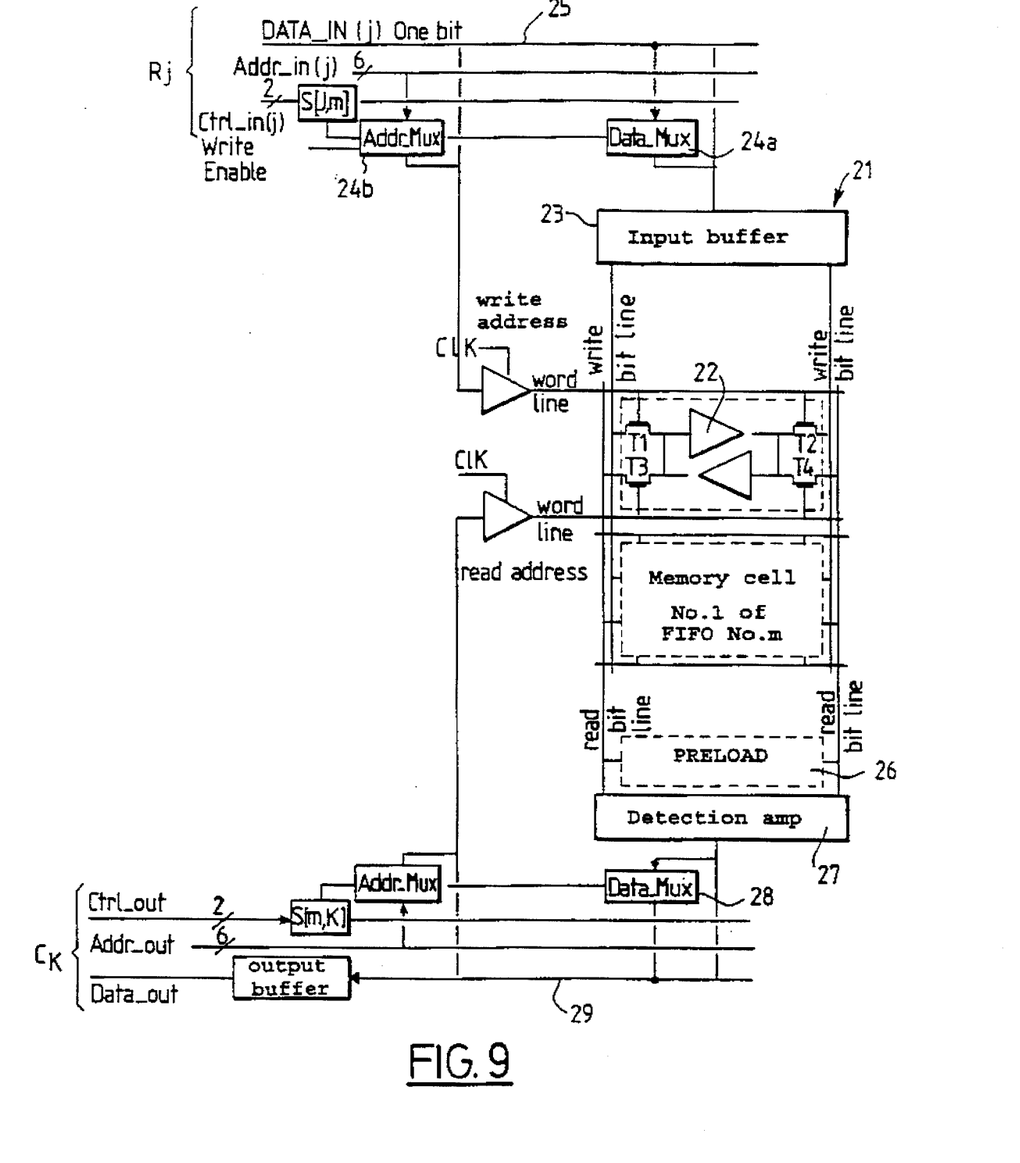
FIG. 9 represents a memory cell for one bit, associated with input and output multiplexing circuits according to the invention.

The structure of the control means 18 and of their link to a FIFO memory element 17 is explained in conjunction with FIG. 9.

Dual-port RAM memory use enables the number of transistors to be reduced as compared with the use of register cells. A memory cell 21 is composed of two inverters 22 and four transistors T1 to T4, an input buffer 23 connected by a data input multiplexor 24a to one bit 25 of an input bus Rj, a preload circuit and a detection amplifier 27 which is linked across an output multiplexor (24a', 24b') to one bit 29 of an output bus Ck.

FIG. 9 shows the RAM memory cell 21 described above with its input multiplexing (24a, 24b) and output multiplexing (24a', 24b'), which makes it possible to associate one of the available FIFOs with a row Rj, and a column-data output Ck with the relevant FIFO.

The figure represents just one memory cell of a FIFO m (out of a plurality N3 of FIFOs), and corresponding to a single bit, it being understood that there are as many elementary cells in one FIFO as there are bits per FIFO.

The memory cell operates as follows:

Write:

the write bit lines are set to 1,0 or 0,1 depending on the input value over the duration of the "write enable" signal. The write address is one of the "wordlines" of the memory during the signal Clk and turns on the transistors T1 and T2. The memory cell 21 is set as a function of the state of the "bit lines".

Read:

the read address selects a "word line" from the memory and turns on the transistors T3 and T4 of the memory cell. The contents of the RAM cell are transferred on the read bit lines. This differential signal is relatively weak and must be amplified by the read amplifier ("sense amplifier") in order to be transformed into a binary signal.

Each row Rj of the interconnection memory includes a data bus Data_in on for example 8 bits (a single bit is represented), a write address in the FIFO Addr_in of 6 bits (the case of a 64-byte FIFO) and two control lines Ctrl_in making it possible to set a flip-flop S[J,m] to 1 or 0 and a write enable signal. Writing to a memory cell can be performed only if the corresponding control flip-flop has been set by an external controller (not forming part of the present invention), so as to establish a communication across this FIFO.

Figure 10:
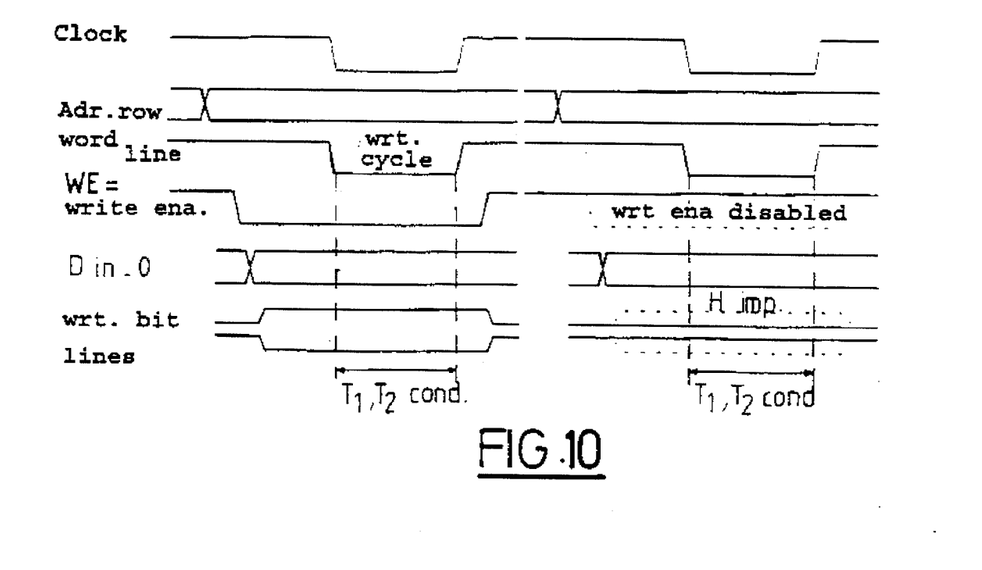
FIG. 10 is a diagram representing the signals involved in a write cycle.

FIG. 10 shows on the left the write timing diagram when the write enable and S[J,m] are active, and when one of the two is inactive, on the right. The data Data_in is transferred to the selective memory cell at the address Addr_in for all the FIFOs linked to this row which have their flip-flop S[J,m] active.

Figure 11:
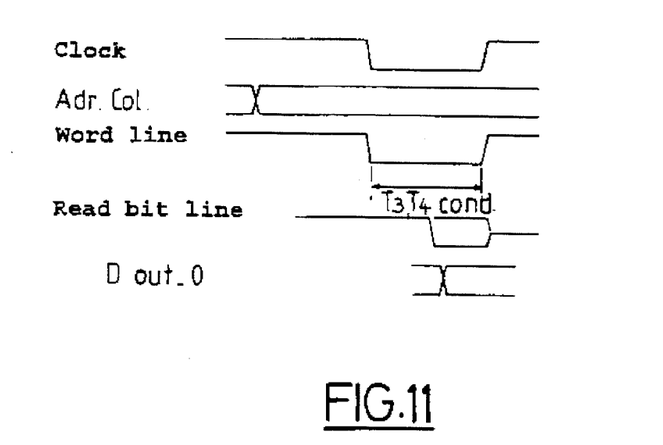
FIG. 11 is a diagram representing the signals involved in a read cycle.

In read mode, (see FIG. 11), the selecting of the output of a FIFO and the addressing of a byte are performed in the same manner with the aid of a data multiplexor 24a' Data_mux and of address multiplexors 24b' Addr_mux selected by an activated flip-flop S[m,k].

Figure 12:
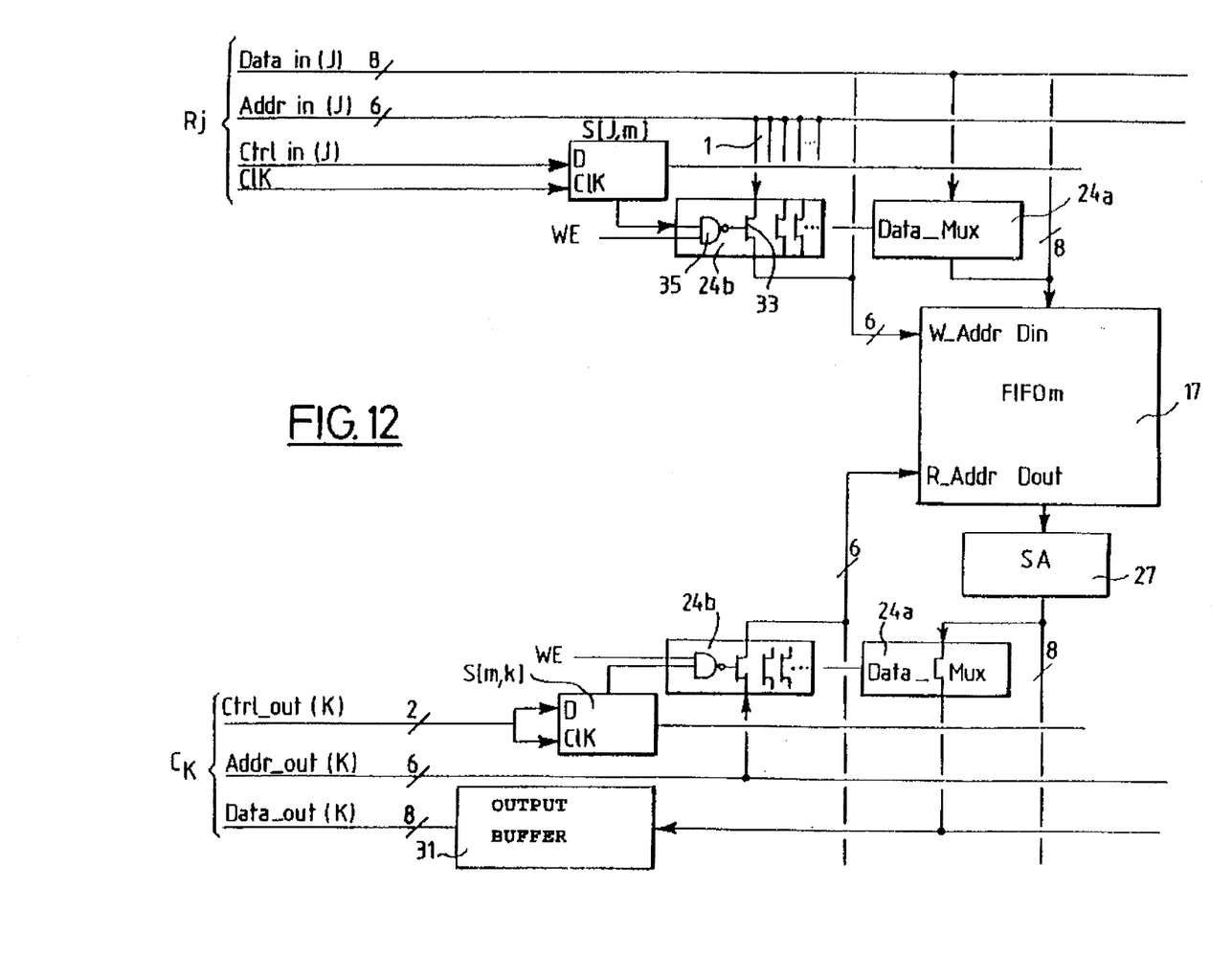
FIG. 12 represents in a more detailed way the logic associated with the input and output multiplexing circuits.

FIG. 12 represents in more detail the structure of an input bus Rj (1≦j≦N1) connected by way of a FIFO 17 m (1≦m≦N3) to an output bus Ck (1≦k≦N2).

The data bus Data_in(j), which carries for example on 8 bits, is transported to the input of the mth FIFO of the interconnection memory (1≦m≦N3), by way of an input data multiplexor 24a. The write address in the FIFO W_Addr is specified on the address bus Addr_in(J) carrying for example on 6 bits, multiplexed across the address multiplexor 24b.

The address and data multiplexors (24b, 24a) have a similar structure formed of interrupt switches with transistors 33, controlled by the output signal from a flip-flop S[j,m] which receives as input, from a controller not represented, a command datum D, and a clock signal Clk.

The output from the flip-flop S[j,m] is transmitted to the inputs of the transistors 33 by way of AND gates 35 which receive the write enable signal WE on their second input.

The data output from FIFO m is transmitted by way of the detection amplifier 27 to the data multiplexor 24a' connected to the data output bus Data_out(k), by way of an output buffer 31.

The output write address R_Addr is multiplexed on the output address bus across an address multiplexor 24b' of identical structure to that described earlier.

Output from FIFO m to the output bus Ck is enabled only when a flip-flop S[m,k] is activated by a control signal D and a clock Clk.

Figure 13:
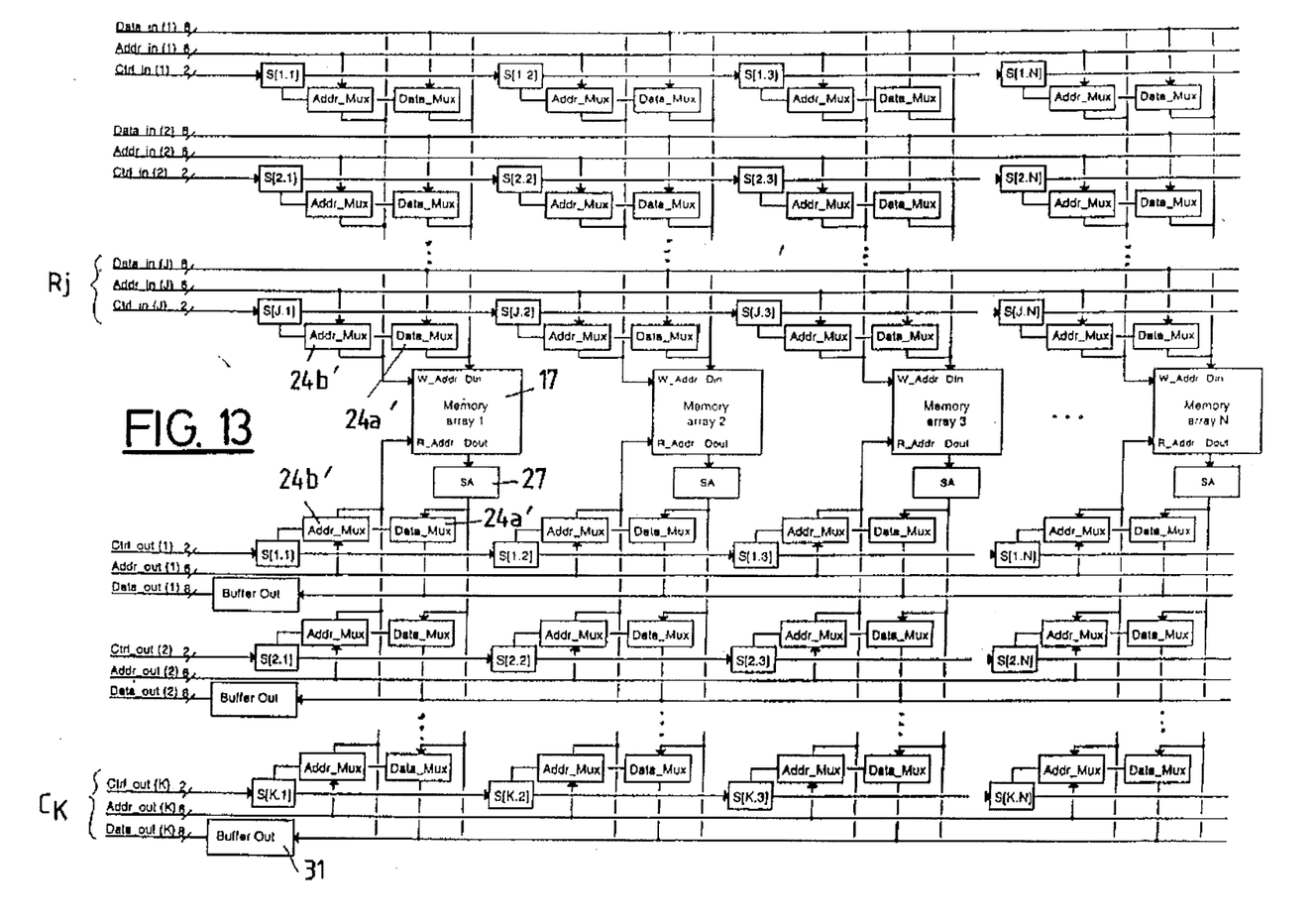
FIG. 13 represents an example embodiment of the virtual interconnection memory according to the invention.

FIG. 13 shows an example embodiment of the complete virtual interconnection memory.

Only J input rows Data_in(1) to Data_in(N1=J) and k columns Data_out(1) to Data_out(N2=k) are represented. The conventional matrix according to FIG. 5, requires N1×N2 FIFOs and N1 FIFOs for FIG. 6 (where N1 is the number of rows and N2 the number of columns).

The matrix of FIG. 13 in accordance with the invention includes N3=N FIFOs, N being chosen so as to ensure a negligible transmission blockage percentage. To ensure a blockage percentage inferior to that of the matrix represented in FIG. 6, N is preferably greater than N1=J.

The input Din and the write address W_Addr of each FIFO are linked to each input row across the Data_Mux 24a and Addr_Mux 24b described earlier, each being enabled by its own control flip-flop S[j,k]. The flip-flops of one row are set at the time the communication is established, the controller having chosen one or more FIFOs for this row. These can be set like a shift register S[1,1], S[1,2], S[1,3], ... S[1,N] as represented, or in separate lines. If several flip-flops are enabled at the same time on one and the same row, the corresponding datum Data_in will be written to several FIFOs at the address Addr_in.

In the same way, the output Dout of a FIFO is linked to an output column Data_out[(1) to (k)] across an identical array. Dout of a FIFO is linked to the bus Data_out() across Data_Mux 24b'. The address R_Addr is selected by corresponding Addr_out(). The corresponding multiplexors Data_Mux 24a' and Addr_Mux 24b' are enabled by a flip-flop S[1,N] operating in the same way as that of the input rows.

Thus, for example, if flip-flops S[1,1] and S[1,N] row 1, and S[2,2] row 2 on the input side; then S[2,1] column 1, S[1,2] column 2, and S[k,N] column N for the outputs, are enabled:

Data_in(1) is transferred to the address Addr_in(1) in FIFOs 1 and N,

Data_in(2) is transferred to the address Addr_in(2) in FIFO 2, the contents of FIFO 2 address Addr_out(2) are linked to Data_out(1), the contents of FIFO N address Addr_out(N) are linked to Data_out(k).

In FIG. 13, the read amplifier 27 of each FIFO 17 is linked directly to its corresponding FIFO and the output buffer (Buffer Out) 31 is attached to the outputs of the read amplifiers. If the number of FIFOs N>>N2=k, it is preferable to place the read amplifiers 27 in part or in full at the input of each output buffer (Buffer Out) 31.

From the foregoing, it emerges that the interconnection-point memory according to the invention solves the problems related to the known devices. By virtue of the invention, communications can be established between asynchronous data senders and receivers using a small number of FIFO memory elements and a reduced memory size, whilst preserving performance and especially a blockage percentage almost identical to those of the interconnection memories provided with FIFOs at each interconnection point.

Furthermore, the number of FIFOs required is independent of the number of rows and columns of the matrix of the memory, and depends only on the acceptable blockage rate.

I claim:

1. An interconnection-point memory comprising:

an array of a first plurality of input buses for connection to a first plurality of data-sender devices having the same number as the number of input buses included in the first plurality of input buses;

an array of a second plurality of output buses for connection to a second plurality of data-receiver devices having the same number as the number of output buses included in the second plurality of output buses;

a third plurality of switching memories, each of said third plurality of switching memories defining a first-in, first-out FIFO memory device having a write port and a read port;

first control means operably interposed between said third plurality of switching memories and said first plurality of input buses for temporarily connecting in a virtual manner the write port of at least one selected switching memory to a selected input bus; and second control means operably interposed between said second plurality of output buses and said third plurality of switching memories for temporarily connecting in a virtual manner at least one output bus to the read port of said one selected switching memory, said one selected switching memory thereby constituting a temporary interconnection point independent of the first plurality of input buses and the second plurality of output buses to be interconnected.

2. An interconnection-point memory as set forth in claim 1, wherein said first control means comprises a first plurality of input multiplexor circuits for each of said third plurality of switching memories, said first plurality of input multiplexor circuits being operable to multiplex the first plurality of input buses to the write port of a selected switching memory of said third plurality of switching memories;

said first control means further including a first control register for each of said input multiplexor circuits included in said first plurality of input multiplexor circuits and operably connected thereto for enabling or disabling the said input multiplexor circuit corresponding thereto dependent upon the binary content of said first control register.

3. An interconnection-point memory as set forth in claim 2, wherein said second control means comprises a second plurality of output multiplexor circuits for each of said third plurality of switching memories, said second plurality of output multiplexor circuits being operable to multiplex the read port of the said selected switching memory of said third plurality of switching memories to the second plurality of output buses; and said second control means further including a second control register for each of said output multiplexor circuits included in said second plurality of output multiplexor circuits and operably connected thereto for enabling or disabling the said output multiplexor circuit corresponding thereto dependent upon the binary content of said second control register.

4. An interconnection-point memory as set forth in claim 3, wherein said first plurality of input buses and said second plurality of output buses include data and address bits transmitted by the first plurality of data-sender devices to the corresponding input multiplexor circuits and by the corresponding output multiplexor circuits to the second plurality of data-receiver devices;

control bits transmitted to said first control registers associated with each input multiplexor circuit and said second control registers associated with each output multiplexor circuit in ensuring interconnection between a selected data and input address bus and a selected data and output address bus.

5. An interconnection-point memory as set forth in claim 3, wherein each of said first and second control registers operably associated with said first plurality of input multiplexor circuits and said second plurality of output multiplexor circuits comprises flip-flops mounted in a shift-register mode.

6. An interconnection-point circuit as set forth in claim 3, further including a read amplification circuit connected between the read port of each of said third plurality of switching memories and the corresponding output multiplexor circuits of the second plurality of output multiplexor circuits.

7. An interconnection-point memory as set forth in claim 1, wherein each of said second plurality of output buses has an output buffer circuit; and a plurality of read amplification circuits arranged together to define a group of read amplification circuits connected to said output buffer circuit.

8. An interconnection-point memory as set forth in claim 1, wherein the number of switching memories included in said third plurality of switching memories is smaller than the number of interconnection points for the interconnection-point memory as defined by multiplying the number represented by the first plurality of input buses by the number represented by the second plurality of output buses.

* * * * *